United States Patent
Choi

(10) Patent No.: US 9,003,616 B2
(45) Date of Patent: Apr. 14, 2015

(54) PLASTIC CLIP

(75) Inventor: Youn Young Choi, Yangsan-si (KR)

(73) Assignee: Nifco Korea Inc., Cheonan-si, Chungcheongnam-do (KR)

(*) Notice: Subject to any disclaimer, the term of this patent is extended or adjusted under 35 U.S.C. 154(b) by 0 days.

(21) Appl. No.: 13/985,327

(22) PCT Filed: Feb. 15, 2012

(86) PCT No.: PCT/KR2012/001139
§ 371 (c)(1),
(2), (4) Date: Sep. 12, 2013

(87) PCT Pub. No.: WO2012/111977
PCT Pub. Date: Aug. 23, 2012

(65) Prior Publication Data
US 2014/0000071 A1    Jan. 2, 2014

(30) Foreign Application Priority Data
Feb. 17, 2011   (KR) .................... 10-2011-0014045

(51) Int. Cl.
*F16B 2/22* (2006.01)
*F16B 21/07* (2006.01)
*B60R 13/02* (2006.01)
*F16B 5/06* (2006.01)
*F16B 21/12* (2006.01)

(52) U.S. Cl.
CPC ............ *F16B 2/22* (2013.01); *Y10T 24/44752* (2015.01); *F16B 21/075* (2013.01); *B60R 13/0206* (2013.01); *F16B 5/065* (2013.01); *F16B 5/0657* (2013.01); *F16B 21/12* (2013.01)

(58) Field of Classification Search
CPC ............. F16B 5/06; F16B 21/07; F16B 2/20; F16B 17/00; B60R 13/00
USPC .............. 24/289, 295, 297, 453, 458, 543, 24/581.11; 411/45–47
See application file for complete search history.

(56) References Cited

U.S. PATENT DOCUMENTS

| | | | | |
|---|---|---|---|---|
| 5,966,782 A * | 10/1999 | Ishihara et al. | ................. | 24/297 |
| 6,074,150 A * | 6/2000 | Shinozaki et al. | ............ | 411/508 |
| 6,317,937 B1 * | 11/2001 | Ishihara et al. | ................. | 24/297 |
| 6,405,413 B2 * | 6/2002 | Ichimaru et al. | ................ | 24/297 |

(Continued)

FOREIGN PATENT DOCUMENTS

| | | |
|---|---|---|
| JP | H06-051513 U | 7/1994 |
| KR | 20-0389499 Y | 7/2005 |
| KR | 20-2010-0009891 U | 10/2010 |

*Primary Examiner* — Robert J Sandy
*Assistant Examiner* — David Upchurch
(74) *Attorney, Agent, or Firm* — Manabu Kanesaka

(57) ABSTRACT

A plastic clip of the present invention includes a clip boss integrally formed in a fixed panel; and a clip main body detachably assembled to the clip boss. The clip boss includes fitting portions provided in two lower side portions of a vertical plate provided with a fitting hole; and locking projections provided in front and back upper ends of the fitting portions. The clip main body includes an inverted triangular input portion provided in a lower end portion; a locking projection provided in an upper end portion of the input portion; a clip-boss input guide hole provided in the center of an upper end; a clip-boss input guide portion provided in the center of an internal upper portion and connected to the clip-boss input guide hole; and an elastic fitting piece provided in a lower end of the clip-boss input guide portion.

2 Claims, 5 Drawing Sheets

(56) References Cited

U.S. PATENT DOCUMENTS

| | | | |
|---|---|---|---|
| 6,449,814 B1* | 9/2002 | Dinsmore et al. | 24/297 |
| 6,665,914 B2* | 12/2003 | Ogawa | 24/297 |
| 6,796,006 B2* | 9/2004 | Hansen | 24/297 |
| 7,231,696 B2* | 6/2007 | Asano et al. | 24/297 |
| 7,300,089 B2* | 11/2007 | Kuroda | 296/39.1 |
| D572,129 S* | 7/2008 | Keays | D8/395 |
| 7,401,388 B2* | 7/2008 | Hansen | 24/297 |
| 7,461,436 B2* | 12/2008 | Asano | 24/297 |
| 7,536,755 B2* | 5/2009 | Nakajima et al. | 24/297 |
| 7,805,815 B2* | 10/2010 | Babian et al. | 24/295 |
| 7,862,273 B2* | 1/2011 | Ooyama et al. | 411/45 |
| 2003/0079316 A1* | 5/2003 | Ogawa | 24/297 |
| 2003/0200634 A1* | 10/2003 | Hansen | 24/297 |
| 2005/0155191 A1* | 7/2005 | Asano et al. | 24/297 |
| 2007/0050955 A1* | 3/2007 | Hansen | 24/297 |
| 2007/0186389 A1* | 8/2007 | Smith et al. | 24/297 |

* cited by examiner

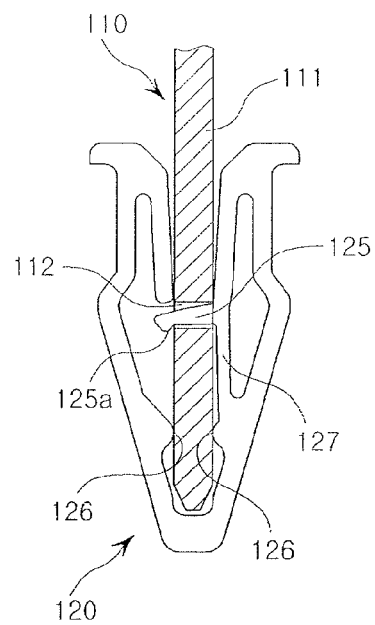

PLASTIC CLIP

RELATED APPLICATIONS

The present application is National Phase of International Application No. PCT/KR2012/001139 filed Feb. 15, 2012, and claims priority from Korean Application No. 10-2011-0014045, filed Feb. 17, 2011.

FIELD OF TECHNOLOGY

The present invention relates to a plastic clip, more specifically, a plastic clip in which a clip main body is combined with a clip boss integrally formed in a fixed panel.

BACKGROUND ART

Generally, various interior materials beginning with a fascia board (FACIA) inside an automobile are configured wherein a combination panel is assembled to the fixed panel, and when the combination panel is assembled to the fixed panel in this manner, there are many examples using a plastic clip composed of the clip boss integrally formed in the fixed panel, and the clip main body detachably assembled to the clip boss.

However, conventionally, in the plastic clip composed of the clip boss integrally formed in the fixed panel, and the clip main body detachably assembled to the clip boss, it is very difficult to assemble the clip main body to the clip boss or disassemble, so that there are problems that not only many assembly hours are required, but also many assembly defects occur so as to cause a low productivity and a cost increase. Also, there is a problem that a breakdown repair relative to the combination panel is difficult.

Also, in a conventional structure, an assembly state of the clip main body relative to the clip boss is unstable, and there is a problem that a flowage and noise of the clip main body due to an external impact in a usage process occur.

DISCLOSURE OF THE INVENTION

Problems to be Solved by the Invention

The present invention is made in view of the aforementioned conventional actual conditions, and an object thereof is to provide a plastic clip capable of preventing the flowage and noise due to the external impact by firmly combining the clip main body with the clip boss integrally formed in the fixed panel.

Means for Solving the Problems

In order to obtain the aforementioned object, a plastic clip of the present invention comprises a clip boss integrally formed in a fixed panel, and a clip main body detachably assembled to the clip boss.

In the plastic clip of the present invention, the clip boss is configured wherein a fitting portion is provided in two lower side portions of a vertical plate provided with a fitting hole; and locking projections provided in front and back upper ends of the fitting portion. The clip main body has an inverted triangular input portion provided in a lower end portion; a locking projection provided in an upper end portion of the input portion; a clip-boss input guide hole provided in the center of an upper end; a clip-boss input guide portion connected to the clip-boss input guide hole provided in the center of an internal upper portion; and an elastic fitting piece provided in a lower end of the clip-boss input guide portion.

Also, in the plastic clip of the present invention, the elastic fitting piece of the clip main body has one side portion as a fixed end integrally formed in a lower end portion on one side of the clip-boss input guide portion, and the other side portion as a free end sealing a lower portion on the other side of the clip-boss input guide portion.

In the plastic clip of the present invention, the clip main body has a clip-boss support projecting portions provided on two internal sides of the input portion; and a connecting piece provided between the lower end portion on one side of the clip-boss input guide portion formed integrally with the elastic fitting piece, and the clip-boss support projecting portion on one side.

Effect of the Invention

In the plastic clip of the present invention, the clip main body is easily and firmly assembled to the clip boss integrally formed in the fixed panel, so that as well as improving an assembly property of the clip main body, a flowage or noise of the clip main body due to an external impact in a usage process can be significantly reduced, and in a process of assembling the fixed panel to the combination panel or disassembling the fixed panel from the combination panel, a breakage of the clip main body can be prevented so as to obtain an effect of significantly improving a durability and merchantability of the plastic clip.

BRIEF DESCRIPTION OF THE DRAWINGS

FIGS. 6a to 6d are side views showing a combination process of a clip main body wherein the clip main body is combined with a clip boss in the plastic clip according to one embodiment of the present invention and only a vertical clip is shown in a cross section to better illustrate the combination process.

BEST MODES OF CARRYING OUT THE INVENTION

Hereinafter, specific description of the present invention for obtaining the aforementioned object will be explained in detail based on attached drawings.

Figure 1:
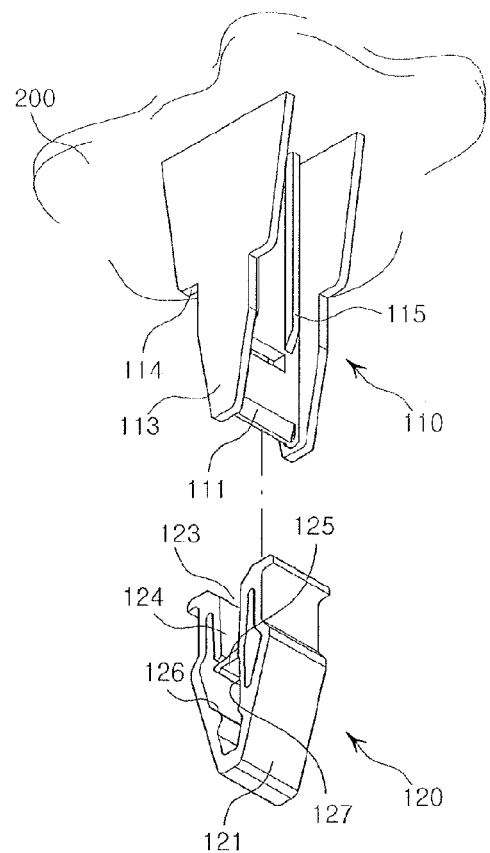
FIG. 1 is an exploded perspective view of a plastic clip according to one embodiment of the present invention.
Figure 2:
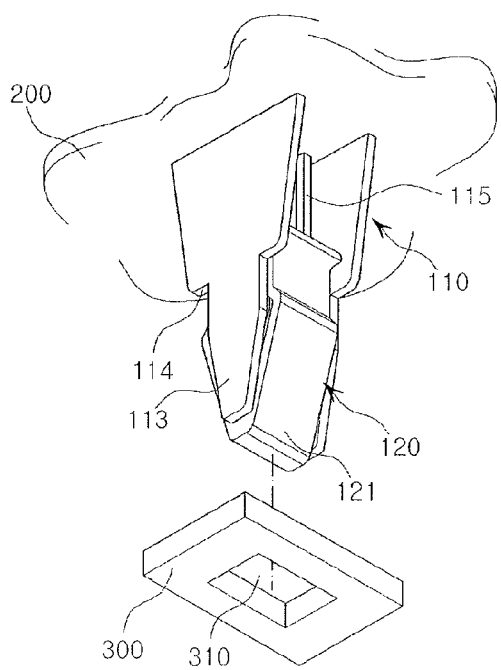
FIG. 2 is a perspective view showing a state before a combination panel is combined with the plastic clip according to one embodiment of the present invention.
Figure 3:
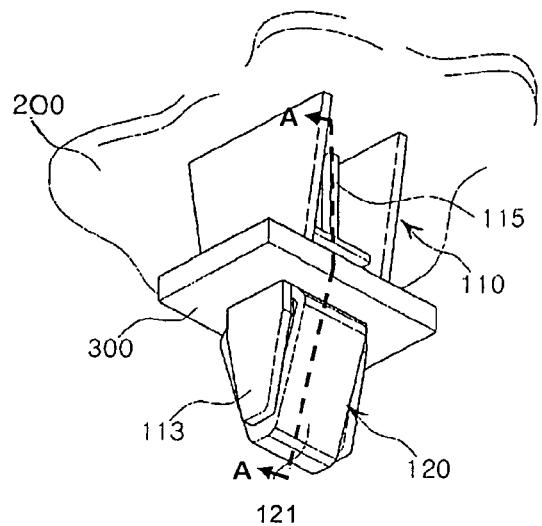
FIG. 3 is a perspective view showing a state after the combination panel is combined with the plastic clip according to one embodiment of the present invention.

FIG. 1 is an exploded perspective view of a plastic clip according to one embodiment of the present invention; FIG. 2 is a perspective view showing a state before a combination panel is combined with the plastic clip according to one embodiment of the present invention; and FIG. 3 is a perspective view showing a state after the combination panel is combined with the plastic clip according to one embodiment of the present invention.

Figure 4:
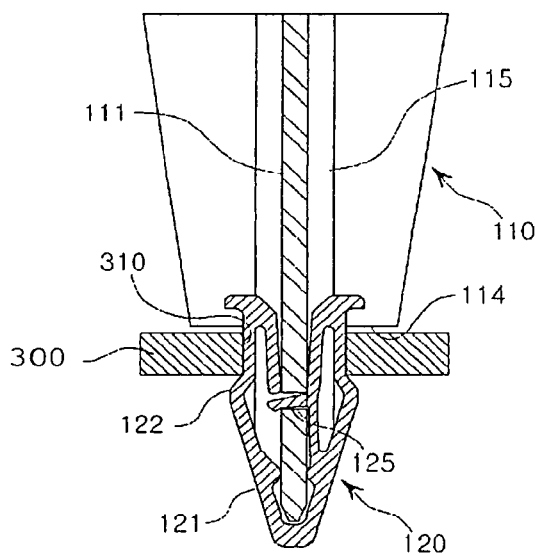
FIG. 4 is a longitudinal cross-sectional view, taken along a line A-A in FIG. 3, showing the state after the combination panel is combined with the plastic clip according to one embodiment of the present invention.
Figure 5:
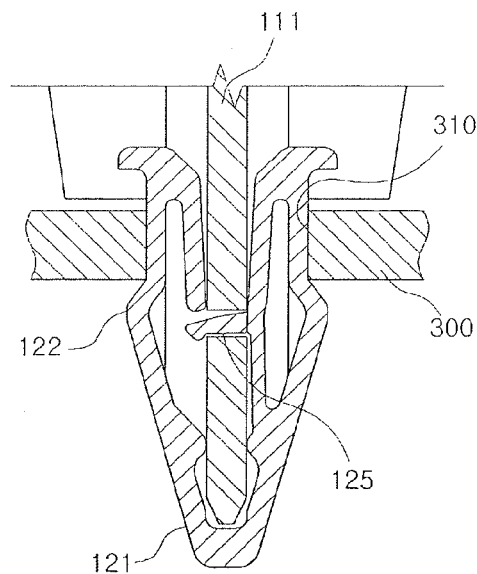
FIG. 5 is a substantial enlarged view of FIG. 4.

Also, FIG. 4 is a longitudinal cross-sectional view showing the state after the combination panel is combined with the plastic clip according to one embodiment of the present invention; and FIG. 5 is a substantial enlarged view of FIG. 4.

As shown in FIG. 1 to FIG. 5, a plastic clip 100 of the present invention comprises a clip boss 110 integrally formed in a fixed panel 200; and a clip main body 120 detachably assembled to the clip boss 110.

In the clip 100 of the present invention, the clip boss 110 is provided with fitting portions 113 in two lower side portions of a vertical plate 111 wherein a fitting hole 112 is provided; locking projections 114 in front and back upper ends of the fitting portions 113; and support ribs 115 respectively on a front face and a back face of the vertical plate 111.

Also, the clip main body 120 is provided with an inverted triangular input portion 121 in a lower end portion; a locking projection 122 in an upper end portion of the input portion 121; a clip-boss input guide hole 123 in the center of an upper end; a clip-boss input guide portion 124 connected to the clip-boss input guide hole 123 in the center of an internal upper portion; and an elastic fitting piece 125 in a lower end of the clip-boss input guide portion 124.

In the elastic fitting piece 125 of the clip main body 120, one side portion is configured as a fixed end integrally formed in a lower end portion on one side of the clip-boss input guide portion 124, and the other side portion is configured as a free end sealing a lower portion on the other side of the clip-boss input guide portion 124. The elastic fitting piece 125 of the clip main body 120 is provided with a locking projection 125a in a lower end on a free end side.

On the other hand, in an illustrated embodiment, the clip main body 120 is provided with clip-boss support projecting portions 126 on two internal sides of the input portion 121; and a connecting piece 127 between the lower end portion on one side of the clip-boss input guide portion 124 wherein the elastic fitting piece 125 is integrally formed, and the clip-boss support projecting portion 126 on one side.

FIGS. 6a to 6d are drawings showing a combination process of the clip main body wherein the clip main body is combined with the clip boss in the plastic clip according to one embodiment of the present invention.

Figure 6A:
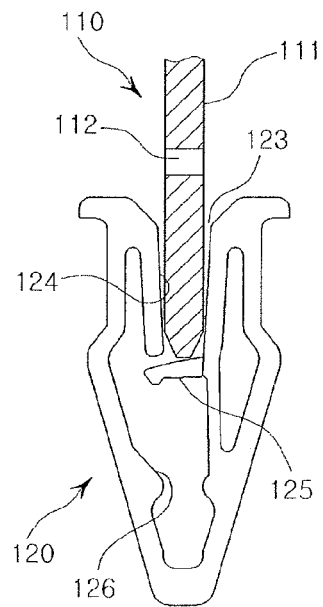

In the clip 100 of the present invention, when the clip main body 120 is combined with the clip boss 110 integrally formed in the fixed panel 200, as shown in FIG. 6a, first, after the vertical plate 111 of the clip boss 110 is inserted into the clip-boss input guide portion 124 through the clip-boss input guide hole 123 of the clip main body 120, if a lower end of the vertical plate 111 abuts against the elastic fitting piece 125, the vertical plate 111 is tilted for only a given angle (for example, 15 degrees) to the free end side of the elastic fitting piece 125, and is continuously inserted.

Figure 6B:
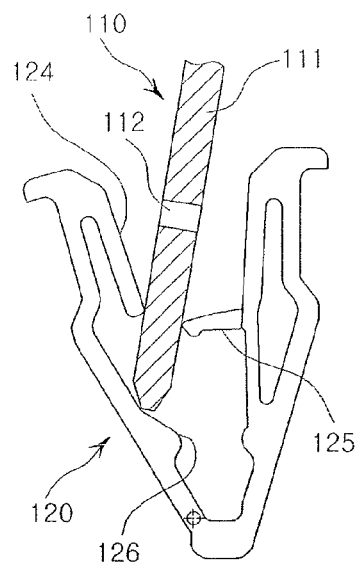
Figure 6C:
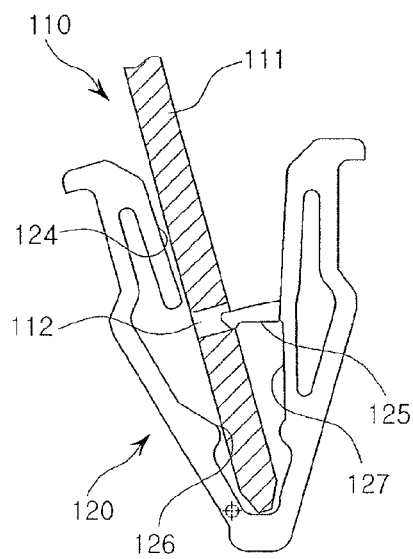

As shown in FIG. 6b, when the lower end of the vertical plate 111, which has passed outside the elastic fitting piece 125, abuts against the clip-boss support projecting portion 126 of the clip main body 120, the vertical plate 111 is tilted in an opposite direction and is continuously inserted. As shown in FIG. 6c, when an end portion of the elastic fitting piece 125 is inserted into the fitting hole 112 at the same time when the lower end of the vertical plate 111 abuts against an internal lower end of the clip main body 120, the vertical plate 111 is vertically raised.

As shown in FIG. 6d, when the vertical plate 111 is vertically raised, the elastic fitting piece 125 completely passes through the fitting hole 112, and the clip-boss support projecting portions 126 provided on the two internal sides of the input portion 121 of the clip main body 120 bilaterally push the vertical plate 111 so as to support the vertical plate 111.

Accordingly, the locking projection 125a provided in the lower end on the free end side of the elastic fitting piece 125 is locked in the fitting hole 112, so that even if the vertical plate 111 has flowed in a right-and-left direction, the vertical plate 111 becomes undetached from the elastic fitting piece 125.

Therefore, according to the plastic clip 100 of the present invention, a flowage or noise of the clip main body 120 due to an external impact in a usage process disappears.

On the other hand, as mentioned above, after the clip main body 120 has been combined with the clip boss 110 integrally formed in the fixed panel 200, when the input portion 121 of the clip main body 120 is inserted into a combination hole 310 formed in a combination panel 300, after the input portion 121 of the clip main body 120 has interiorly narrowed to pass the combination hole 310, the input portion 121 of the clip main body 120 restores to its former state again. As a result, as shown in FIG. 4 and FIG. 5, the locking projections 114 provided in the upper end of the fitting portions 113 of the clip boss 110 are locked in an upper end of the combination panel 300, and the locking projection 122 provided in the upper end of the input portion 121 of the clip main body 120 is locked in a lower end of the combination hole 310 so as to be capable of an assembly between the fixed panel 200 and the combination panel 300.

Meanwhile, when the fixed panel 200 is detached from the combination panel 300, if a fastened portion of the plastic clip 100 relative to the fixed panel 200 is pulled to a side opposite to the combination panel 300, the input portion 121 of the clip main body 120 can pass the combination hole 310 while interiorly being narrowed, so that the fixed panel 200 can be pulled out of the combination panel 300.

On the other hand, in a process of detaching the fixed panel 200 from the combination panel 300, if the fastened portion of the plastic clip 100 relative to the fixed panel 200 is pulled, first, the vertical plate 111 of the clip boss 110 integrally formed in the fixed panel 200 is pulled. As a result, the elastic fitting piece 125 of the clip main body 120, which has been inserted in the fitting hole 112 of the vertical plate 111, is pulled, so that the clip main body 120 is pulled. However, at that time, the free end of the elastic fitting piece 125 of the clip main body 120 which is pulled together with the vertical plate 111 contacts the lower end of one side of the clip-boss input guide portion 124. Accordingly, even if the fixed panel 200 is pulled by a slightly unreasonable force, as well as preventing a breakage of the elastic fitting piece 125, a tension force can be stably transmitted to the whole clip main body 120.

The present invention explained above is not limited to the aforementioned embodiment and drawings, and it will be obvious to those having an ordinary skill in the art of the present invention that various replacements, deformations, and changes may be made without departing from the scope of the invention.

What is claimed is:

1. A plastic clip, comprising:
   a clip boss integrally adapted to be formed with a fixed panel, and including:
      a vertical plate having a fitting hole;
      fitting portions provided in two lower side portions of the vertical plate; and
      locking projections provided in front and back upper ends of the fitting portions; and
   a clip main body detachably assembled to the clip boss, and including:
      an input portion having an inverted triangular shape;
      locking projections provided at upper side portions of the input portion;

a clip-boss input guide hole provided at a center of an upper end of the input portion;

a clip-boss input guide portion provided in a center of an internal upper portion to define the clip-boss input guide hole, the clip-boss input guide portion having one side with a free lower end in the clip main body, and another side opposite to the one side;

a connecting piece extending from a lower end of the another side of the clip-boss input guide portion to a lower inner side of the input portion, an elastic fitting piece having a fixed end integrally formed with the connecting piece and a free end located under the one side, the elastic fitting piece extending to cross the clip-boss input guide hole; and clip-boss support projecting portions provided on two internal sides of the input portion, wherein the connecting piece and the another side of the clip-boss input guide portion are integrally formed together, and the connecting piece connects the lower end of the another side of the clip-boss input guide portion and one of the clip-boss support projecting portions on a side close to said lower end.

2. The plastic clip according to claim 1, wherein the input portion has a first side, and a second side located opposite to the first side and close to the another side of the clip-boss input guide portion, the connecting piece and the another side of the clip-boss input guide portion continuously extend inside the input portion along the second side of the input portion to define a space by the connecting piece, the another side and the second side.

\* \* \* \* \*